US006475451B1

(12) United States Patent
Leppin et al.

(10) Patent No.: US 6,475,451 B1
(45) Date of Patent: Nov. 5, 2002

(54) MERCURY REMOVAL FROM GASEOUS PROCESS STREAMS

(75) Inventors: Dennis Leppin, Chicago, IL (US); Nagaraju Palla, Woodridge, IL (US)

(73) Assignee: Gas Technology Institute, Des Plaines, IL (US)

( * ) Notice: Subject to any disclaimer, the term of this patent is extended or adjusted under 35 U.S.C. 154(b) by 0 days.

(21) Appl. No.: 09/644,361

(22) Filed: Aug. 23, 2000

(51) Int. Cl.[7] .............................. B01D 53/64; C10L 3/10
(52) U.S. Cl. .................. 423/210; 48/127.3; 48/127.5
(58) Field of Search .................. 423/210; 48/127.3, 48/127.5

(56) References Cited

U.S. PATENT DOCUMENTS

| | | | |
|---|---|---|---|
| 3,437,476 A | 4/1969 | Dotson et al. .................. 75/103 |
| 4,094,777 A | 6/1978 | Sugier et al. .................. 210/32 |
| 4,474,896 A | 10/1984 | Chao .......................... 502/216 |
| 4,693,731 A | 9/1987 | Tarakad et al. ................. 55/72 |
| 4,764,219 A | 8/1988 | Yan ............................. 134/2 |
| 4,786,483 A | 11/1988 | Audeh ........................ 423/210 |
| 4,830,829 A | 5/1989 | Craig, Jr. ....................... 422/7 |
| 4,915,818 A | 4/1990 | Yan ......................... 208/251 R |
| 5,013,358 A | 5/1991 | Ball et al. ..................... 75/742 |
| 5,238,488 A | 8/1993 | Wilhelm ...................... 75/742 |
| 5,409,522 A | 4/1995 | Durham et al. ............... 75/670 |
| 5,505,766 A | 4/1996 | Chang ......................... 95/134 |
| 5,670,122 A | 9/1997 | Zamansky et al. .......... 423/210 |
| 5,733,516 A | 3/1998 | DeBerry ..................... 423/220 |
| 5,738,834 A | 4/1998 | Deberry ..................... 422/177 |
| 6,024,931 A | 2/2000 | Hanulik ...................... 423/107 |

FOREIGN PATENT DOCUMENTS

| | | | |
|---|---|---|---|
| EP | 319 615 | 6/1989 | |
| EP | 0506132 A1 * | 9/1992 | ................. 423/210 |
| JP | 60129125 A * | 7/1985 | ................. 423/210 |
| JP | 62140627 A * | 6/1987 | ................. 423/210 |
| SU | 835474 * | 6/1981 | ................. 423/210 |

OTHER PUBLICATIONS

Corinne Boudon et al.: Anodic Oxidation of the Mercury Electrode In The Presence of Macrobicyclic Ligands, *J. Electroanal. Chem.*, vol. 135, 93–102, 1982. No month.

GRI Mercury Removal Technology (Hgone™)Process Design and Engineering Final Report, vol. 1 and vol. 2, Sep. 1995, Prepared by Central Environmental, Inc., Houston, Texas.

R.T. Talasek and A.J. Syllaios: Reaction Kinetics of $Hg_{1-x}Cd_xTe/Br_2-CH_3OH$, J. Electrochem. Soc.: Solid–State Science and Technology, vol. 132, No. 3, 656–659, Mar. 1985.

Alan M. Bond et al.: Voltammetric, Coulometric, Mercury–199 NMR, and Other Studies Characterizing New and Unusual Mercury Complexes Produced by Electrochemical Oxidation of Mercury (II) Diethyldithiocarbamate. Crystal and Molecular Structure of Octakis(N,N–diethyldithiocarbamato) pentamercury (II) Perchlorate, *J. Am. Chem. Soc.*, vol. 109, No. 7, 1969–1980, 1987. No month.

F. Albert Cotton and Geoffrey Wilkinson: *Advanced Inorganic Chemistry*, Fifth Edition, 610–613, A Wiley–Interscience Publication., 1988.

* cited by examiner

*Primary Examiner*—Stanley S. Silverman
*Assistant Examiner*—Timothy C. Vanoy
(74) *Attorney, Agent, or Firm*—Mark E. Fejer

(57) ABSTRACT

A process for removing mercury from a gaseous process stream. The process involves contacting a mercury-containing gaseous process stream with a regenerable mercury scavenger solution to form a treated stream having a reduced mercury content as compared to the mercury-containing gaseous process stream and a used scavenger solution having an increased mercury content. The regenerable mercury scavenger solution contains an oxidizing agent such as nitric acid, a complexing agent such as oxygen-containing agents and/or thiol and a solvent, for example, a mixture of methanol and water.

27 Claims, 1 Drawing Sheet

MERCURY REMOVAL FROM GASEOUS PROCESS STREAMS

BACKGROUND OF THE INVENTION

This invention relates generally to mercury removal and, more particularly, to the removal of mercury from gaseous process streams.

Mercury is recognized as a toxic material, the presence of which can cause or result in significant health hazards. Further, the presence of mercury is known to create, cause or result in a danger of corrosion of certain materials which come into contact therewith.

Natural gas, depending on its origin, may contain variable quantities of mercury. It is known that mercury in natural gas can cause failures in associated process equipment such as in aluminum heat exchangers.

A commonly employed method for removing mercury from natural gas streams is based on the passage of the mercury-containing stream through a non-regenerable sulfur-impregnated carbon bed. In practice, the beds employed in such treatment schemes are necessarily large in order to ensure against mercury breakthrough while avoiding frequent changeouts of absorbent. As will be appreciated, reducing or minimizing the frequency of absorbent changeouts is generally desired as the associated facility may not operate during the changeout operation. Also, changeout operations are typically very labor intensive and may also pose significant health or other hazards to the involved personnel. Further, disposal of the spent material and recovery of the mercury engenders additional costs and scheduled downtime.

In general, the use of non-regenerable sorbent beds does not admit of an easy way by which the degree to which a sorbent has been used or spent can be sampled. Consequently, an operator is generally left with no choice but to change all of the sorbent when it is convenient to do so whether it is necessary or not. Further, an unexpected or prolonged period with abnormally high amounts of mercury in the gas to be treated may cause an overload on the absorbent such as to result in bed breakthrough with consequent damage to the plant or an alarm condition such as may necessitate a plant shutdown.

In addition to natural gas in a gaseous or liquid state, other fluids such as various flue gas process streams are also known to include or contain significant quantities of mercury such that the removal of mercury therefrom may be desired or required. For example, environmental standards for particulate and total mercury emissions from coal-fired power plants, petroleum refineries, incinerators, metallurgical operations, thermal treatment units and other particulate- and mercury-emitting facilities are increasingly becoming more demanding. The U.S. Environmental Protection Agency (EPA) has indicated that over 50 tons of mercury are emitted annually as a result of coal utilization in the utility industry. To that end, the EPA is looking to determine the appropriateness and need to regulate toxic air pollutant emissions (focusing on mercury) from coal-fired utility boilers.

Various flue gas emission control strategies or schemes have been developed. Common power plant operations strategies have, for example, included or employed coal cleaning, electrostatic precipitators, fabric filters, scrubbers, spray dryers, and carbon adsorption. While existing flue gas emission control strategies or schemes are generally capable of significantly reducing the potential amount of mercury released to the atmosphere, the effectiveness of such controls can vary considerably on either a plant-by-plant or a boiler-by-boiler basis.

Any contemplated regulation will likely be directly dependent on the availability of cost-effective control technologies capable of implementation in a very diverse coal-fired utility industry.

In view of the above, there is a continuing need and demand for efficient, low-cost technologies for mercury removal from gaseous streams. In particular, there is a need and a demand for efficient, low-cost technologies for removing mercury from natural gas streams and for mercury emission reductions in flue gas streams from utility plants such as employ coal combustion.

Wilhelm, U.S. Pat. No. 5,238,488, issued Aug. 24, 1993 and assigned to Gas Research Institute discloses a process and solution for transforming insoluble mercury metal into a soluble compound such as may be applied for cleaning equipment already contaminated with mercury. The process includes oxidizing elemental mercury to form mercury cations, contacting the mercury cations with a complexing agent to form a soluble complex, and dissolving the soluble complex with a solvent. The solution contains an oxidizing agent (e.g., nitric acid), a complexing agent and a solvent.

However, a need and demand for efficient, low-cost technologies for mercury removal from gaseous streams remains.

SUMMARY OF THE INVENTION

A general object of the invention is to provide an improved technique for the removal of mercury from gaseous process streams.

A more specific objective of the invention is to overcome one or more of the problems described above.

The general object of the invention can be attained, at least in part, through a process wherein a first mercury-containing gaseous process stream is contacted with a regenerable mercury scavenger solution to form a treated stream having a reduced mercury content as compared to the first mercury-containing gaseous process stream and a used scavenger solution having an increased mercury content. In accordance with one preferred embodiment of the invention, the regenerable mercury scavenger solution comprises a solution which contains:

a) nitric acid effective to oxidize mercury contained within the first mercury-containing gaseous process stream to form mercury cations, b) a complexing agent suitable for forming a soluble mercury compound when contacting the mercury cations, and c) a solvent effective to dissolve the soluble mercury compound.

The prior art generally fails to provide a desirably low-cost process for the removal of mercury from gaseous process streams such as streams which are formed by or include natural gas or flue gas streams such as resulting from coal combustion. In particular, the prior art generally fails to provide an approach for the removal of mercury from such gaseous streams which permits as easy as desired measurement or determination of remaining mercury absorption capacity. Still further, the prior art generally fails to provide for regeneration of mercury removal capacity on a continuous or semi-continuous basis such as may be desired for more efficient and/or effective operation or processing.

The invention further comprehends a process for removing mercury from a flue gas process stream. In accordance with one preferred embodiment of such process, a mercury-containing flue gas process stream is contacted with a regenerable mercury scavenger solution to form a treated stream having a reduced mercury content as compared to the mercury-containing flue gas process stream and a used scavenger solution having an increased mercury content. The used scavenger solution is then regenerated. The regenerable mercury scavenger solution employed in such processing preferably comprises a solution containing:

a) nitric acid effective to oxidize mercury contained within the mercury-containing flue gas process stream to form mercury cations, b) a complexing agent suitable for forming a soluble mercury compound when contacting the mercury cations, and c) a solvent effective to dissolve the soluble mercury compound.

The invention still further comprehends a process for removing mercury from a natural gas stream. In accordance with one preferred embodiment of such process, a mercury-containing natural gas feed stream is contacted with a regenerable mercury scavenger solution to form a treated stream having a reduced mercury content as compared to the natural gas feed stream and a used scavenger solution having an increased mercury content. The used scavenger solution is then regenerated. The regenerable mercury scavenger solution employed in such processing preferably comprises a solution containing:

a) nitric acid effective to oxidize mercury contained within the natural gas feed stream to form mercury cations, b) a complexing agent suitable for forming a soluble mercury compound when contacting the mercury cations, and c) a solvent effective to dissolve the soluble mercury compound.

Other objects and advantages will be apparent to those skilled in the art from the following detailed description taken in conjunction with the appended claims and drawing.

DETAILED DESCRIPTION OF THE INVENTION

Figure 1:
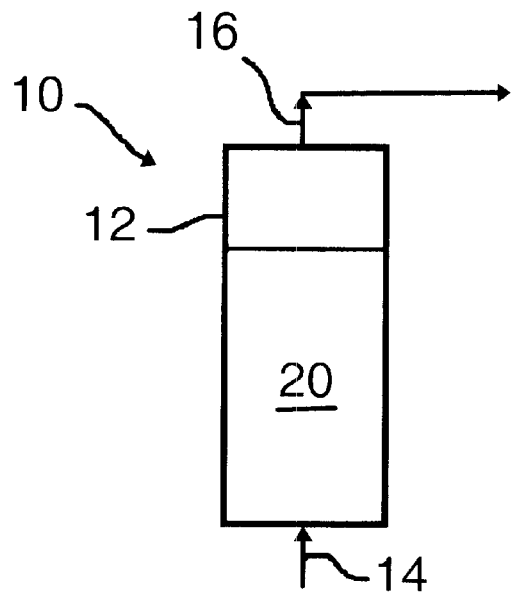
FIG. 1 is a simplified, partially in section, schematic drawing of a processing assembly for the removal of mercury from a gaseous process stream, in accordance with one preferred embodiment of the invention.

The present invention may be embodied in a variety of different structures. As representative, the FIG. 1 illustrates the present invention as embodied in a processing assembly, generally designated by the reference numeral 10, such as may be used to remove of mercury from a selected gaseous process stream.

The processing assembly is generally composed of a contactor vessel 12 with an inlet conduit 14 and an outlet conduit 16. The inlet conduit 14 will generally contain a mercury-containing gaseous process stream from which mercury is to be removed. As will be appreciated by those skilled in the art and guided by the teachings herein provided, various mercury-containing gaseous process streams can be appropriately treated in accordance with the invention. For example, suitable process streams for treatment in accordance with the invention may include natural gas streams such as may contain or include variable quantities of mercury. While in practice natural gas deposits typically contain mercury in relative amounts in the range of 0.01 to 100 $\mu g/m^3$, it is to be appreciated that the broader practice of the invention is not necessarily limited to the treatment of process streams containing such relative amounts of mercury. Thus, the invention can if desired be employed in connection with the processing or treatment of process streams, including those containing natural gas, which contain or include mercury in greater or lesser amounts as may be desired in particular processing regimes.

The contactor 12 is an enclosed vessel adapted to receive the mercury-containing gas stream from the inlet conduit 14. The contactor 12 desirably contains a regenerable mercury scavenger solution 20, as described in greater detail below, with which the mercury-containing gas stream is contacted with to form a treated material having a reduced mercury content as compared to the mercury-containing gas stream from the inlet conduit 14 and a used scavenger solution having an increased mercury content.

As will be appreciated by those skilled in the art and guided by the teachings herein provided, the contactor 12 can be variously constructed such as may be desired in particular applications to promote or ensure the contacting or mixing of the gas stream introduced therein with the mercury scavenger solution 20. For example and without unnecessary limitation, the contactor 12 may be in the form of a packed vessel, a tray-containing vessel, a bubble or sparged liquid-containing tower or a static mixer such as employed as a concurrent scrubber.

The treated material is passed, via the outlet conduit 16, out from the contactor 12 and such as for use or further processing, as may be desired.

A preferred regenerable mercury scavenger solution for use in the practice of the invention is disclosed in the above-identified Wilhelm, U.S. Pat. No. 5,238,488, issued Aug. 24, 1993 as a solution for transforming insoluble mercury metal into a soluble compound. Such solution desirably contains an oxidizing agent, a complexing agent and a solvent.

In accordance with a preferred practice of the invention, the scavenger solution oxidizing agent is desirably effective to oxidize mercury contained within a mercury-containing gaseous process stream to form mercury cations. The scavenger solution complexing agent is generally suitable for forming a soluble mercury compound when contacting the mercury cations. The scavenger solution solvent is generally effective to dissolve such soluble mercury compound, thus retaining the mercury in the scavenger solution. In practice, the mercury-containing complex or compound will typically be stable in the scavenger solution in concentrations of up to about a few hundred mg per liter of scavenger solution.

Used scavenger solution can be appropriately regenerated such as by using a common regeneration technique such as by first cooling the used scavenger solution, or a selected portion thereof, such that appropriately complexed mercury crystals precipitate or otherwise form. Such mercury-containing solids can then be removed or separated from the solution such as via a filtration operation. While various filtration techniques can be used, filtration via ceramic filters can be advantageous as such filter elements may more easily permit or are conducive to retort and subsequent reuse. For example, such ceramic filters engorged with precipitate containing the complexing or chelating agent and mercury can be emplaced in furnace and heated such that the chelant is decomposed and the mercury volatilized and recaptured by condensation downstream of the retort. Furnaces employed in such practice can desirably operate without a flow of air to the enclosed volume containing the filters and apply external, radiant heat to reach the desired heating conditions. As will be appreciated by those skilled in the art and guided by the teachings herein provided, the volume of mercury-containing gases to be cooled and condensed can desirably be minimized such as to improve treatment process economics. Further by maintaining the temperature of the retort process at a level at which there is no significant deterioration of the filters, the retorted filters may accordingly be reused. Alternatively, filtration via disposable filters such as fabricated of cloth, cotton or other chosen fabric such as to combust upon retort, may, if desired, be employed.

As will also be appreciated by those skilled in the art and guided by the teachings herein provided, regeneration can be conducted on-line, continuously or in a batch by batch fashion, as may be desired for particular installations or applications. For example, a parallel contactor vessel containing scavenger solution in accordance with the invention can be provided should it be required to process a mercury-containing gaseous process stream during the period of time the used scavenger solution contents of a contactor vessel are being processed.

In practice, the choice between continuous operation and batch operation for solvent regeneration may be based more on cost considerations rather than technical issues. For example, for small plants, i.e., plants treating a relatively small amount of mercury-containing solvent solution in a given time period, the capital expense, addition to complexity, overall operation reliability, potential worker exposure hazards, and the additional attention of skilled chemical technicians required for a regeneration installation may not be justifiable. In those instances it may be preferred to collect the mercury-containing solution for offsite processing. Presumably such an offsite operator would aggregate the spent mercury-containing solvent solutions from a number of sites and would thus benefit from economies of scale resulting from the processing of larger quantities. In particular, at such larger scales the necessary skilled labor, equipment required for proper attention to safety matters and numerous other costs would be spread over a much larger quantity of solvent solution. As a result, such costs would contribute less to the cost of regeneration on a volume basis. Further, it is well known to those skilled in the art that as the capacity of equipment is increased the relative cost generally increases by an exponential factor of less than one, often as low as 0.6 to 0.7, e.g., the cost of doubling the capacity may only be 50–60% more instead of double the cost (100% more) as expected for a linear extrapolation. Further, commercial transactions for the sale of recycled mercury are likely to be on more favorable terms for a large scale recycler than they would be for an individual plant or producer as the fixed commercial costs (marketing, sales, shipping, handling) will similarly be amortized over a larger quantity of material.

Figure 2:
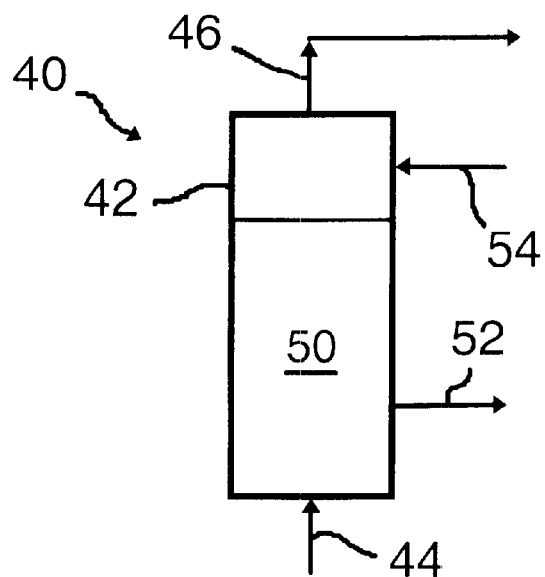
FIG. 2 is a simplified, partially in section, schematic drawing of a processing assembly for the removal of mercury from a gaseous process stream, in accordance with another preferred embodiment of the invention.

FIG. 2 shows an alternative processing assembly 40 such as may be used to remove of mercury from a selected gaseous process stream. The processing assembly 40 includes a single contactor vessel 42, similar to the contactor vessel 12, described above, with an inlet conduit 44, an outlet conduit 46 and containing a regenerable mercury scavenger solution 50, such as described herein. The processing assembly 40, however, is provided with continuous regeneration of a small slipstream of the used scavenger solution. In particular, a slipstream conduit 52 transports used scavenger solution from the contactor 42 for desired processing, e.g., regeneration. Regenerated scavenger solution is returned to the contactor 42 via a return conduit 54. If desired, the volume of the scavenger solution slipstream can be calculated to be compatible with the expected maximum rate of mercury removal, if known. With application of an appropriate regeneration scheme, the capacity of a subject mercury removal system can be appropriately maintained within desired limits.

If desired, used scavenger solution can be transferred to a transport vessel and shipped or otherwise transported to a remote processing facility. For example, such a remote processing facility may be in the form of a mobile unit capable of moving between selected locations. The invention may, if desired, be practiced using a central processing facility such as to process used scavenger solutions from one or multiple installations.

Nitric acid is a known oxidizer for mercury and is a preferred oxidizing agent for use in the practice of the invention. In a preferred practice of the invention, the nitric acid component of the scavenger solution is desirably effective to oxidize mercury contained within the mercury-containing gaseous process stream to form mercury cations.

The complexing agent component of the scavenger solution is desirably selected to be suitable for forming a soluble mercury compound when contacting the so formed mercury cations. As disclosed in Wilhelm, U.S. Pat. No. 5,238,488, mercury is known to combine with halogens and other non-metals such as sulfur, selenium and lead. Further, the reaction rate of bromine with mercury in methanol has been found to be proportional to the bromine concentration. $HgBr_2$ is quite soluble in methanol. Bromine, though, is known to also attack aluminum. HgS is very insoluble in methanol and water having a solubility product in the range of $10^{-54}$. While the presence of water may cause some hydrolysis of the $Hg^{2+}$ and $S^{2-}$, the solubility generally remains low.

As also disclosed in Wilhelm, U.S. Pat. No. 5,238,488, mercury also combines with other metals like zinc or silver to form amalgams; but, these will still attack aluminum while in the liquid form. Further, in the absence of physical mixing it is also sometimes difficult to get the desired stoichiometry to form a desired mercury-containing product.

Wilhelm, U.S. Pat. No. 5,238,488, further discloses that mercury forms coordination complexes with oxygen, sulfur, phosphorous and nitrogen-containing compounds. The most common are the sulfur complexes with thiols (R-S-H compounds) and dithiocarbamic acids ($R_2NCSSH$). The most common is a complex with diethyldithiocarbamic:

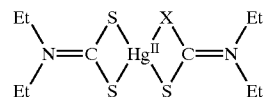

and a more complicated species $[Hg_5(Et_2NCSS)_8]^{2+}$.

Other compounds disclosed as known to complex mercury in thiocarbamic acids ($R_2CSSH$), thiocarbazones (RNNSCNHNHR) and crypates. With crypates, the mercury ion becomes entrapped within the cage-like structure and coordinated to the nitrogen atoms.

While various complexing agents can be employed in the practice of the invention, Wilhelm, U.S. Pat. No. 5,238,488 focused on the active thiol compounds of thiocarbamic acids, thiocarbazones and cryptates as complex formers for mercury. In particular, as the thiocarbamic acids have the advantage of ease of preparation, low cost and high solubility in organic solvents, the initial thrust of the effort was to determine the feasibility of using diethyldithiocarbamic acid sodium salt (DEDCA) in low freezing point solvents. Methanol proved to be not only the best solvent for DEDCA but has other significant advantages in that it is relatively inexpensive and readily available. In addition, it is the lowest boiling of any of the solvents considered which will facilitate its removal from field aluminum heat exchangers.

Wilhelm, U.S. Pat. No. 5,238,488, further discloses that the most common oxidants for mercury are nitric acid and bromine. Further, any oxidizing agent strong enough to attack mercury will preferably, for such use this application, leave intact the aluminum-aluminum oxide surface. High concentrations of nitric acid are usually required to oxidize mercury. In Wilhelm, the effect of nitric acid concentration was measured for both mercury dissolution rate as well as aluminum dissolution rate with the minimum of the etch rate of aluminum dissolution and the maximum mercury dissolution occurring with 0.1 N nitric acid in 90:10 methanol:water. As disclosed, at this concentration, the nitric acid is a strong enough oxidizer to reform the oxide coating where aluminum metal is exposed, yet not acidic enough to cause any significant loss of aluminum.

The use of bromine as an oxidizer for mercury in an aluminum system was ruled out due to the excessively high aluminum dissolution rate even with 0.01 M bromine in methanol.

Also in Wilhelm, the effect of the sequestering agent DEDCA concentration on mercury dissolution rate at several concentrations of oxidizing acid under conditions of low mercury surface area and low sequestering solution flow over the mercury surface. The optimum concentration was 0.5 M DEDCA. Additional attempts to increase the flow rate showed no further improvement.

As also shown in Wilhelm, the results for the 90:10 methanol:water/0.1 N nitric acid without DEDCA were parallel for both low surface/low flow and moderate surface/moderate flow. Without the DEDCA there was little dissolution or oxidation of mercury regardless of the mercury/solution contact ratio. Other sequestering agents failed to improve upon the results of DEDCA. The solubility of diphenylthiocarbazone (DPTC) and ethylenediaminetetraacetic acid (EDTA) was not high enough to form 0.1 M solutions. These were run in equilibrium with the solid. The cryptate was soluble but failed to facilitate the oxidation enough to complex the mercury. Dibutyldithiocarbamic acid zinc salt (DBDCA) appeared to lower the surface tension of the mercury, as pools of mercury spread out in its presence. However, it was less effective than DEDCA in sequestering the mercury. It also failed to completely dissolve in the solvent mixture. Likewise a mixture of DEDCA and DBDCA did not improve over the DEDCA alone. With 0.1 M solutions of DEDCA, saturation appeared to be reached before 24 hours, but with 0.5 M DEDCA not only was the total mercury dissolved higher after 24 hours, but it more than doubled after an additional 24 hours. This was not the case, however, upon changing the solvent ratio to 95:5 methanol:water or to 100 percent methanol. As with the low surface/low flow, they saturated before 24 hours.

Wilhelm also found that 90:10 methanol:water/0.5 M DEDCA without nitric acid was able to sequester 15 mg/l of mercury. This indicates that the DEDCA itself is an effective oxidizer for mercury, the presence of nitric acid, however, enhances the rate.

Further, Wilhelm discloses that at high surface/high flow and elevated temperature (140° F.), the total dissolved mercury reached 220 mg/l after 24 hours and 330 mg/l after 48 hours. There was no aluminum dissolution after even after 3 days at reflux. Upon cooling the hot solution, crystals appeared indicating formation of a DEDCA complex. Consistent therewith, mercury can be continuously removed by cycling the Hg-saturated solution through appropriate cooling and filtering apparatus.

While the invention has generally been described above with reference to the treatment of a mercury-containing natural gas process stream it will be appreciated that the broader practice of the invention is not necessarily so limited. That is, the invention can, if desired, be applied to the treatment of various gaseous process streams including, for example, various flue gas streams such as may occur or be present in various facilities. In particular, the invention is perceived to have significant application in the treatment of flue gas process streams resulting from coal combustion, e.g., flue gas from coal-fired power plants.

As will be appreciated by those skilled in the art and guided by the teachings herein provided, the scavenger solution solvents used in such applications will desirably be selected to be stable at the temperatures associated with such process streams. Thus, for mercury removal from a flue gas process stream, such as a flue gas resulting from coal combustion, the selected solvent will generally be desirably stable at temperatures up to about 300° F., for example. In particular, suitable solvents for inclusion in such scavenger solutions in accordance with the invention may typically have a vapor pressure in the range of less than about 0.01 mm Hg at 20° C. and, generally preferably in the range of about 0.005 mm Hg at 20° C. Specific examples of suitable solvents for inclusion in such scavenger solutions include aqueous solutions of potassium carbonate, such as have previously been used in hydrogen sulfide removal and as known to be effective in the treatment of process streams at elevated temperatures such as may be associated with various mercury-containing process streams for the treatment of which the invention may suitably be applied, as well as nonaqueous solvents such as 1,2,3,4 tetrahydronaphthalene, N,N dimethylaniline, diphenyl ether, dibenzyl ether, terphenyls, diphenylethanes, alkylated polycyclic aromatics and mixtures thereof.

The liquid-based mercury removal approach of the invention permits the easy measurement of the remaining mercury-scavenging capacity of the solution. Further, no downtime is necessarily required in order to permit replacement of active material. Also, the liquid-based approach and system of the invention can desirably serve to facilitate the establishment of a mobile or a central plant for the regeneration of used scavenger solution from one or more locations or operations.

It is to be understood that the discussion of theory, such as the discussion of the role of the various component members of the regenerable mercury scavenger solution used in the practice of the invention, for example, is included to assist in the understanding of the subject invention and is in no way limiting to the invention in its broad application.

Thus, the invention generally provides an improved process for the removal of mercury from gaseous process streams such as streams which are formed by or include natural gas or flue gas streams such as resulting from coal combustion. In particular, the invention provides an approach for the removal of mercury from such gaseous streams which permits as easy as desired measurement or determination of remaining mercury absorption capacity.

Still further, the invention provides for regeneration of mercury removal capacity on a continuous or semi-continuous basis such as may be desired for more efficient and/or effective operation or processing.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A process for removing mercury from a gaseous process stream, said process comprising:
    contacting a first mercury-containing gaseous process stream with a regenerable mercury scavenger solution to form a treated stream having a reduced mercury content and a used scavenger solution having an increased mercury content, the regenerable mercury scavenger solution comprising;
    a) nitric acid effective to oxidize mercury contained within the first mercury-containing gaseous process stream to form mercury cations,
    b) a complexing agent suitable for forming a soluble mercury compound when contacting the mercury cations, and
    c) a solvent effective to dissolve the soluble mercury compound.

2. The process of claim 1 additionally comprising: regenerating the used scavenger solution.

3. The process of claim 2 wherein the used scavenger solution is regenerated continuously.

4. The process of claim 2 wherein the used scavenger solution is regenerated in a batch fashion.

5. The process of claim 1 wherein the solvent is stable at temperatures up to about 300° F.

6. The process of claim 5 wherein the solvent has a vapor pressure of less than about 0.01 mm Hg at 20° C.

7. The process of claim 6 wherein the solvent comprises an aqueous solution of potassium carbonate.

8. The process of claim 6 wherein the solvent comprises at least one member selected from the group consisting of 1,2,3,4 tetrahydronaphthalene, N,N dimethylaniline, diphenyl ether, dibenzyl ether, terphenyls, diphenylethanes, alkylated polycyclic aromatics and mixtures thereof.

9. The process of claim 1 wherein the first mercury-containing gaseous process stream is a flue gas resulting from coal combustion.

10. The process of claim 1 wherein the nitric acid is approximately 0.1 N.

11. The process of claim 1 wherein the complexing agent is selected from the group consisting of oxygen-containing compounds, sulfur-containing compounds, phosphorus-containing compounds, nitrogen-containing compounds and mixtures thereof.

12. The process of claim 1 wherein the complexing agent is selected from the group consisting of a thiol, a dithiocarbamic acid, a thiocarbamic acid, a thiocarbazone, a cryptate and mixtures thereof.

13. The process of claim 1 wherein the solvent comprises a mixture of methanol and water.

14. The process of claim 1 wherein the solvent has a freezing point below −40° F.

15. A process for removing mercury from a flue gas process stream, said process comprising:
    contacting a mercury-containing flue gas process stream with a regenerable mercury scavenger solution to form a treated stream having a reduced mercury content and a used scavenger solution having an increased mercury content, the regenerable mercury scavenger solution comprising;
    a) nitric acid effective to oxidize mercury contained within the mercury-containing flue gas process stream to form mercury cations,
    b) a complexing agent suitable for forming a soluble mercury compound when contacting the mercury cations, and
    c) a solvent effective to dissolve the soluble mercury compound and regenerating the used scavenger solution.

16. The process of claim 15 wherein the solvent is stable at temperatures up to about 300° F. and has a vapor pressure of less than about 0.01 mm Hg at 20° C.

17. The process of claim 15 wherein the mercury-containing flue gas process stream is a flue gas resulting from coal combustion.

18. The process of claim 15 wherein the nitric acid is approximately 0.1 N.

19. The process of claim 15 wherein the complexing agent is selected from the group consisting of oxygen-containing compounds, sulfur-containing compounds, phosphorus-containing compounds, nitrogen-containing compounds and mixtures thereof.

20. The process of claim 15 wherein the complexing agent is selected from the group consisting of a thiol, a dithiocarbamic acid, a thiocarbamic acid, a thiocarbazone, a cryptate and mixtures thereof.

21. The process of claim 15 wherein the solvent comprises an aqueous solution of potassium carbonate.

22. The process of claim 15 wherein the solvent comprises at least one member selected from the group consisting of 1,2,3,4 tetrahydronaphthalene, N,N dimethylaniline, diphenyl ether, dibenzyl ether, terphenyls, diphenylethanes, alkylated polycyclic aromatics and mixtures thereof.

23. A process for removing mercury from a natural gas stream, said process comprising:
    contacting a mercury-containing natural gas feed stream with a regenerable mercury scavenger solution to form a treated stream having a reduced mercury content and a used scavenger solution having an increased mercury content, the regenerable mercury scavenger solution comprising;
    a) nitric acid effective to oxidize mercury contained within the natural gas feed stream to form mercury cations,
    b) a complexing agent suitable for forming a soluble mercury compound when contacting the mercury cations, and
    c) a solvent effective to dissolve the soluble mercury compound and regenerating the used scavenger solution.

24. The process of claim 23 wherein the nitric acid is approximately 0.1 N.

25. The process of claim 23 wherein the complexing agent is selected from the group consisting of oxygen-containing compounds, sulfur-containing compounds, phosphorus-containing compounds, nitrogen-containing compounds and mixtures thereof.

26. The process of claim 23 wherein the complexing agent is selected from the group consisting of a thiol, a dithiocarbamic acid, a thiocarbamic acid, a thiocarbazone, a cryptate and mixtures thereof.

27. The process of claim 23 wherein the solvent comprises at least one member selected from the group consisting of a mixture of methanol and water, an aqueous solution of potassium carbonate, 1,2,3,4 tetrahydronaphthalene, N,N dimethylaniline, diphenyl ether, dibenzyl ether, terphenyls, diphenylethanes, alkylated polycyclic aromatics and mixtures thereof.

* * * * *